United States Patent [19]

Berwanger et al.

[11] Patent Number: 5,699,881
[45] Date of Patent: Dec. 23, 1997

[54] MULTI-DISC BRAKE ACTUATOR FOR VIBRATION DAMPING

[75] Inventors: Fred William Berwanger, South Bend, Ind.; Daniel S. Reynolds, Long Beach, Calif.

[73] Assignee: AlliedSignal Inc., Morristown, N.J.

[21] Appl. No.: 757,493

[22] Filed: Nov. 27, 1996

Related U.S. Application Data

[63] Continuation-in-part of Ser. No. 626,660, Mar. 22, 1996.

[51] Int. Cl.[6] .................................................. F16D 55/36
[52] U.S. Cl. ...................................... 188/71.5; 188/264 G
[58] Field of Search .............................. 188/18 A, 71.5, 188/73.35, 73.36, 73.37, 264 G, 72.4, 72.6

[56] References Cited

U.S. PATENT DOCUMENTS 4,878,563 11/1989 Baden et al. .................... 188/71.5
5,540,305 7/1996 Hammond et al. ................ 188/71.5

*Primary Examiner*—Robert J. Oberleitner
*Assistant Examiner*—Pamela J. Lipka
*Attorney, Agent, or Firm*—Larry J. Palguta

[57] ABSTRACT

A multi-disc brake (80) includes a piston housing (102) and attached torque tube (94) located about an axle (87). Integrated within the piston housing (102) is a brake actuator (90). The piston housing (102) is located axially between an actuator member (98) of the brake actuator (90) and an axle sleeve (109) and radial portion 87a of the axle (87). Hydraulic actuation of the brake actuator (90) displaces axially the actuator member (98) against a stationary thrust sleeve (99) such that the piston housing (102) is compressed between the actuator member (98) and axle sleeve (109), thereby reducing torsional vibrational movement of the piston housing (102) and torque tube (94) about the axle (87).

11 Claims, 3 Drawing Sheets

MULTI-DISC BRAKE ACTUATOR FOR VIBRATION DAMPING

This is a continuation-in-part of patent application Ser. No. 08/626,660 filed Mar. 22, 1996.

The present invention relates generally to a multi-disc brake, and in particular to a brake actuator which reduces torsional vibrations of the multi-disc brake.

Multi-disc brakes have been used on aircraft for many years. Typically, such multi-disc brakes include a piston housing attached to a torque tube, each disposed about an axle of the aircraft, with a plurality of stator discs engaging the torque tube and an interleaved plurality of rotor discs attached to the surrounding wheel which is mounted rotatability upon the axle. Many multi-disc aircraft brakes are designed to rotate slightly about an axle when the landing gear of the aircraft is being retracted or extended. Such brakes usually have braking torque take-out via a brake arm or other such attachment to the landing gear of the aircraft. During braking, it is possible for the braking torque transmitted through the brake structure to the torque take-out mechanism to cause torsional vibration, what is known as "squeal" vibration, of the brake which may be described simply as rotational oscillation of the brake relative to the axle. Such squeal vibration can occur typically at different frequencies, and result in higher than normal loads being exerted upon the braking torque take-out mechanism which typically include brake rods. The higher brake rod loads can be as many as five times higher than normally experienced, and can result in the piston housing being detached from the brake rod of the torque take-out mechanism. Such problems can result in unscheduled removals of the brake, an "airplane-on-the-ground" status whereby the aircraft cannot fly, and even an air worthiness directive concerning maintenance and inspection of the aircraft.

Investigation of squeal vibration modes indicates that one solution to the problem is to increase coulomb damping, that is, rubbing or sliding friction between two surfaces in order to provide damping in the brake. Brake vibration problems can be improved by reducing the tolerances between adjacent parts of the brake assembly, but this may be dependent upon the structure of the particular brake assembly and can be subject to the wear of the adjacent parts. In many cases, a tight control clearance simply shifts the vibration frequency to a different level and yields unacceptable results. However, if coulomb damping could be provided for the piston housing and attached torque tube, an achievable solution to the squeal vibration problem can be accomplished. One objective of the present invention is to reduce and/or eliminate squeal vibration modes from multi-disc aircraft brakes, by providing coulomb damping during brake actuation. Another objective is to provide coulomb damping of the piston housing during brake actuation in order to increase torque damping and to dissipate more energy or braking torque during brake operation. Another objective of the present invention is to provide the coulomb damping by means of an axial clamping force which clamps the piston housing in place relative to the axle and thereby increase the amount of torque damping effected by the brake and the torque take-out mechanism.

The present invention can accomplish solutions to the above problems by providing a multi-disc brake and actuator for vibration damping, comprising a multi-disc brake disposed about axle means and including a piston housing engaging a torque tube, a first plurality of discs engaging the torque tube, a second plurality of discs for engagement with a wheel, the piston housing being located axially between an actuator and a first axially stationary member at the axle means, and a thrust sleeve engaging a second axially stationary member at the axle means, operation of the actuator causing an actuator member to extend axially and compress the piston housing between the actuator member and first axially stationary member in order to reduce vibrational movement of the piston housing and torque tube relative to the axle means.

One way of carrying out the invention is described in detail below with reference to the drawings which illustrate embodiments in which.

Figure 1:
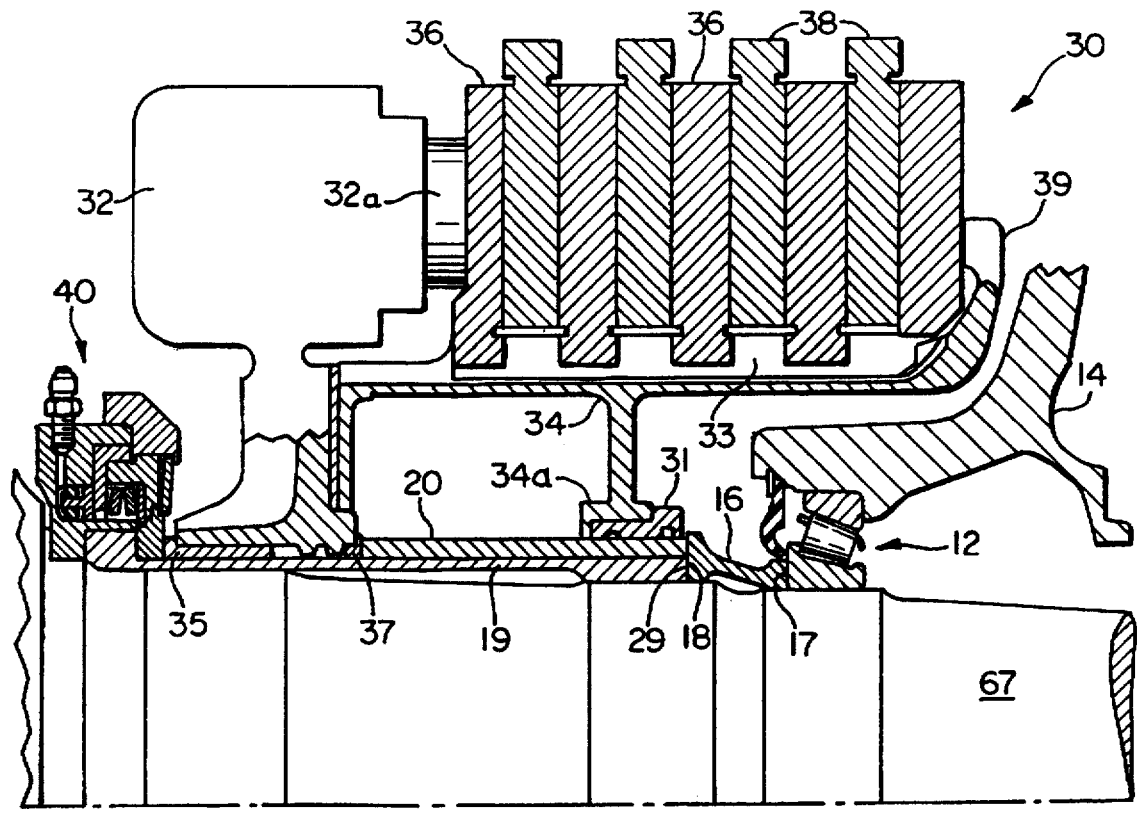
FIG. 1 is a section view of a multi-disc aircraft brake which includes the brake actuator of the present invention.

A multi-disc brake with a brake actuator of the present invention is illustrated FIG. 1. Axle means 67 has disposed there about an axially inner wheel bearing assembly 12 upon which is mounted a portion of the aircraft wheel 14. Also located about axle means 67 is a typical wheel sleeve 16 which is an axially stationary member having one axial end 17 abutting the inner wheel bearing assembly 12 and the other axial end 18 abutting a thrust sleeve 20 and axle sleeve 19. Because the thrust sleeve 20 abuts axially the wheel sleeve 16 that abuts the stationary bearing assembly 12, the thrust sleeve 20 comprises a part of the axially stationary member. The axle sleeve 19 and thrust sleeve 20 are both located about axle means 67, with the axle sleeve extending axially beyond a piston housing of a brake assembly designated generally by reference numeral 30. It should be clearly understood that brake assembly 30 may comprise any steel or carbon aircraft brake assembly. Such assemblies typically include a piston housing 32 attached to a torque tube 34, a plurality of stator discs 36 keyed to splines 33 of torque tube 34, and a plurality of rotor discs 38 keyed to a not shown portion of the aircraft wheel 14. As is well known in the art, the piston housing includes a plurality of pistons 32a which are actuated hydraulically and extend to compress the stator discs and rotor discs between the pistons and backing plate 39. Piston housing 32 includes as part or portions thereof piston housing bushings 35 and 37.

Figure 2:
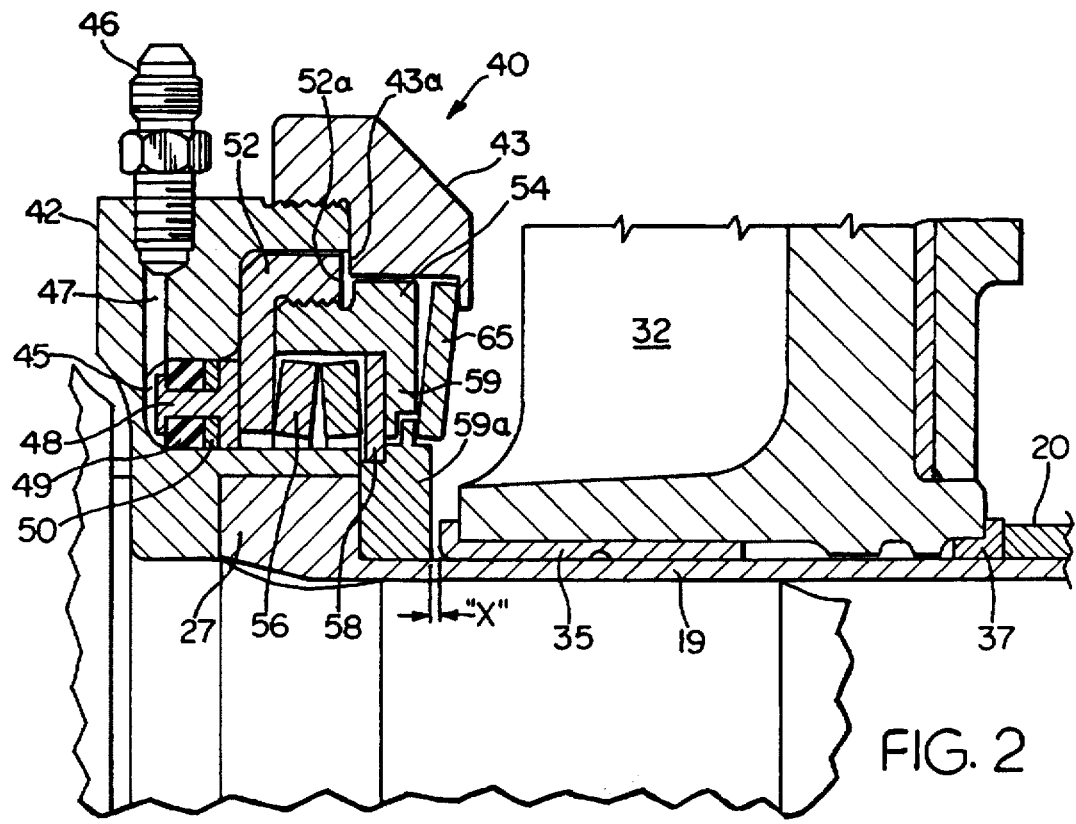
FIG. 2 is an enlarged cross-sectional view of the brake actuator of the present invention.

Located axially adjacent the piston housing 32 is a brake actuator 40 of the present invention. As shown in greater detail in FIG. 2, the actuator 40 comprises a two part actuator housing 42, 43 having therein a hydraulic brake fluid cavity 45 receiving hydraulic brake fluid through port 46 and line 47. The actuator piston 48 includes a seal 49 and a seal backup ring 50. Actuator piston 48 engages axially a movable actuator pad or outer capsule member 52 which, like the other pads of the actuator 40, is annular in shape, and is threadedly attached at an inner diameter thereof to the inner capsule member 54. The outer capsule member 52 and inner capsule member 54 provide an interior caging for a first or internal spring means 56 comprising a plurality of Belleville washers which engage a load washer 58. The inner capsule member 54 has an inner diameter extension 59 which engages an actuator member or ram 59A that provides a radial position and support for the load washer 58. Actuator member 59A is disposed a clearance distance "X" from the piston housing bushing 35. Ram 59A has a stepped radially outer configuration so that it also supplies radial positioning and support for a second spring means or return spring 65 which engages at its other end an inner shoulder of the actuator housing pad 43.

The axle sleeve 19 extends between an axle sleeve foot 27 and sleeve end 29. Sleeve foot 27 abuts the actuator housing pad 42 and sleeve end 29 abuts the wheel sleeve 16. The thrust sleeve 20 abuts at one end the end 18 of wheel sleeve 16 and at the other end a piston housing bushing 37. Located about thrust sleeve 20 is a typical torque tube bushing 31 which is located at the radial inner periphery of torque tube foot 34a.

During operation of the multi-disc aircraft brake 30, pressurized hydraulic fluid is transmitted to the pistons 32A within the piston housing 32. The pressurized hydraulic fluid is also transmitted to the pod 46 of the brake actuator 40. When the aircraft 30 is not operating, the axial clearance "X" is present between the piston housing bushing 35 and the actuator member 59A. As pressurized hydraulic fluid is received within cavity 45 of actuator 40, the actuator piston 48 moves axially to the right in FIGS. 1 and 2 against the outer capsule member 52. A clearance exists between the inner diameter extension 59 of inner capsule member 54 and the actuator member 59A to ensure that loading is transmitted to the actuator member 59A via load washer 58. Return spring 65 provides a low pressure limiter or threshhold mechanism such that until the spring preload has been exceeded, the actuator member 59A is not displaced axially. When the actuator housing part 43 is screwed onto actuator part 42, the return spring 65 is preloaded between the inner lip of part 43 and the upper pad of actuator member 59A. When the hydraulic pressure exceeds a predetermined limit, such as 300 psi, the preload of return spring 65 is exceeded and the capsule member 52 begins to travel axially to the right, moving load washer 58 and actuator member 59A to close up the predetermined clearance "X". As actuator member 59A engages the piston housing bushing 35 of piston housing 32, the piston housing 32 is compressed axially between actuator member 59A and piston housing bushing 35 on one side and the piston housing bushing 37, thrust sleeve 20, wheel sleeve 16 and inner wheel bearing assembly 12 on the other side. This compression or clamping of piston housing 32 results in the piston housing being held in a more rotatably restrained position relative to axle means 10, whereby there is increased torque damping provided during the operation of the brake and braking of the aircraft wheel. Because the brake actuator 40 provides for an increase in the dissipation of braking energy, squeal vibration modes can be reduced or eliminated and thereby reduce the high braking torque loads exerted upon the braking torque take-out mechanism. Thus, the torsional vibration of the brake relative to the axle means is damped and the performance and reliability of the brake can be significantly improved.

Internal springs 56 provide a maximum load limiting mechanism such that when the preload in the springs has been exceeded, springs 56 compress to limit the loads applied to the brake. When member 52 is threaded onto member 54, the springs 56 are preloaded. When the hydraulic pressure exceeds a predetermined level, such as 500 psi, the springs 56 begin to compress whereby shoulder 52A of member 52 moves axially to engage shoulder 43A of housing part 43. Engagement of shoulders 52A and 43A limits the load applied by actuator member 59A to the bushing 35.

Figure 3:
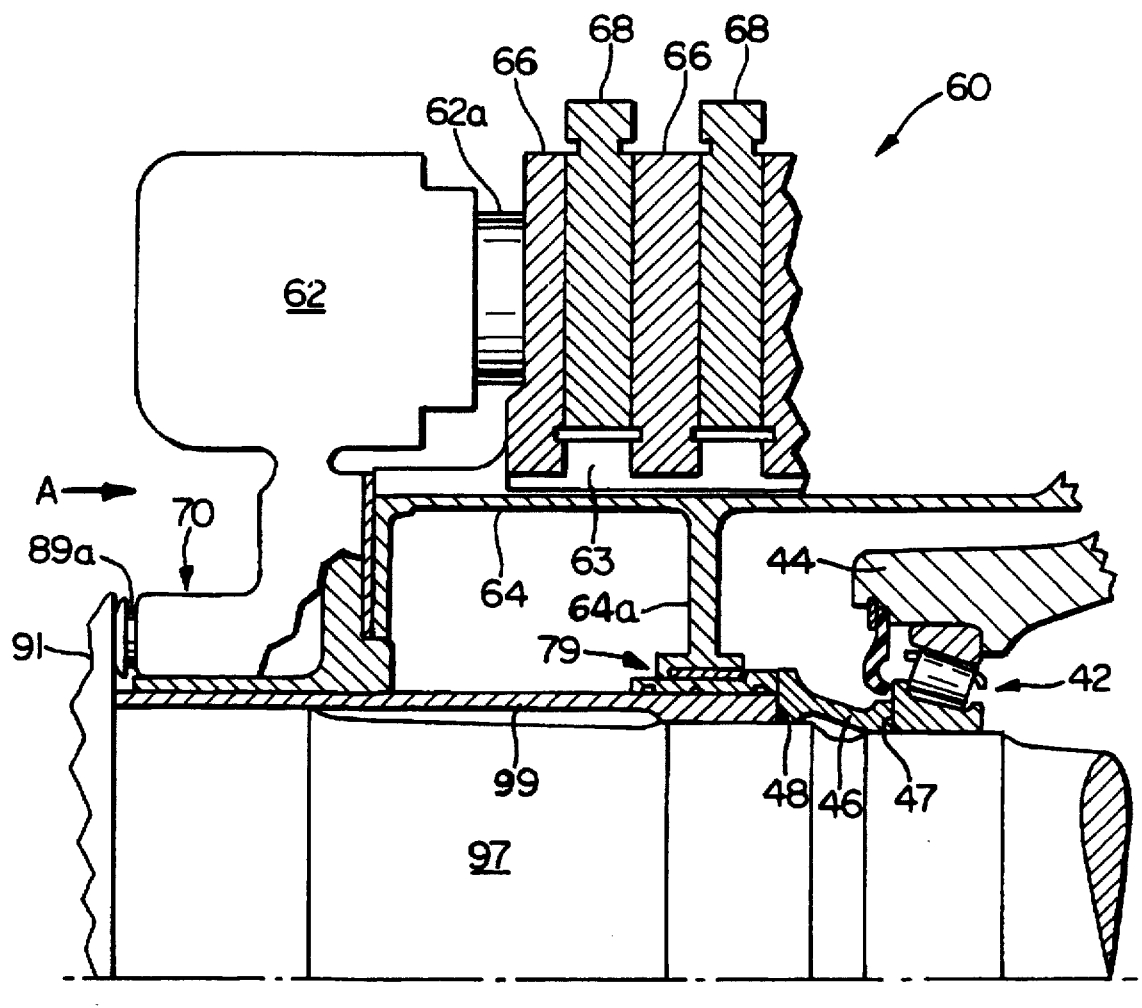
FIG. 3 is a section view of a multi-disc aircraft brake which includes a second embodiment of the brake actuator of the present invention.

A second embodiment of the multi-disc brake with a brake actuator of the present invention is illustrated in FIG. 3. Similar structure is indicated by reference numerals increased by 30. Axle means 97 has disposed thereabout an axially inner wheel bearing assembly 42 upon which is mounted a portion of the aircraft wheel 44. Also located about axle means 97 is a typical wheel sleeve 46 which is an axially stationary member having one axle end 47 abutting the inner wheel bearing assembly 42 and the other axle end 48 abutting a bushing assembly 79 and axle sleeve 99. Bushing assembly 79 is part of a portion of the torque tube foot 64A and torque tube 64. The axle sleeve 49 is located about the axle means 97, with the axle sleeve extending axially beyond a piston housing 62 of a brake assembly designated generally by reference numeral 60. It should be clearly understood that brake assembly 60 may comprise any steel or carbon aircraft brake assembly. Such assemblies typically include a piston housing 62 attached to the torque tube 64, a plurality of stator discs 66 keyed to splines 63 of torque tube 64, and a plurality of rotor discs 68 keyed to a not shown portion of the aircraft wheel 44. As is well known in the art, the piston housing includes a plurality of pistons 62A which are actuated hydraulically and extend to compress the stator discs and rotor discs between the pistons and a backing plate.

Located axially adjacent and integrated within piston housing 62 is a brake actuator 70 of the present invention. Actuator 70 includes an actuator member or piston 89A that can extend and engage the stationary portion 91 of axle means 97. As described for the previous embodiment of the present invention, pressurized hydraulic fluid transmitted to the pistons 62A of piston housing 62 is also transmitted to the brake actuator 70 so that the actuator member 89A extends to engage the stationary portion 91 of axle means 97. A not shown orifice or other restriction means within the hydraulic transmission line is utilized to limit or delay the pressure transmitted to actuator 70 such that the actuator member 89A will effect an axial force against piston housing 62 that reaches its maximum value substantially when the rotors 68 are being compressed between the starors 66. As the actuator member 89A extends against stationary portion 91 to displace piston housing 62 slightly axially in the direction of arrow A in FIG. 3, the torque tube 64 which is firmly attached to the piston housing 62 is abutted tightly at torque tube foot 64A (via bushing assembly 79) against the stationary member or wheel sleeve 46 adjacent torque tube foot 64A, such that the piston housing and torque tube are rubbing respectively against the stationary portion 91 of axial means 97 and end 48 of wheel sleeve 46, thereby damping vibration and reducing or eliminating squeal vibration. The actuator 70 includes a not shown return spring, similar to that utilized in the previous embodiment or including any other resilient means that effects the same function, to return the actuator member to its unpressurized position at the termination of braking. The return of the piston 89a to its unpressurized position can effect a slight clearance with stationary portion 91 and will ensure that the brake 60 will rotate slightly relative to axle means 97 during retraction of the aircraft landing gear.

The present invention provides a mechanism for reducing or eliminating squeal vibration modes of a multi-disc brake. The embodiment of FIG. 1 requires parts and design changes that have little impact upon the braking system and which are easily retrofitted on existing brake assemblies. The embodiment of FIG. 3 can be utilized when a new brake design is being implemented and an integrated actuator is desired. The brake actuator utilizes existing hydraulic brake pressure to provide a positive clamping or rotational retention of the multi-disc brake relative to the axle means to provide a reduction or elimination of squeal vibration modes for multi-disc aircraft brakes.

Figure 4:
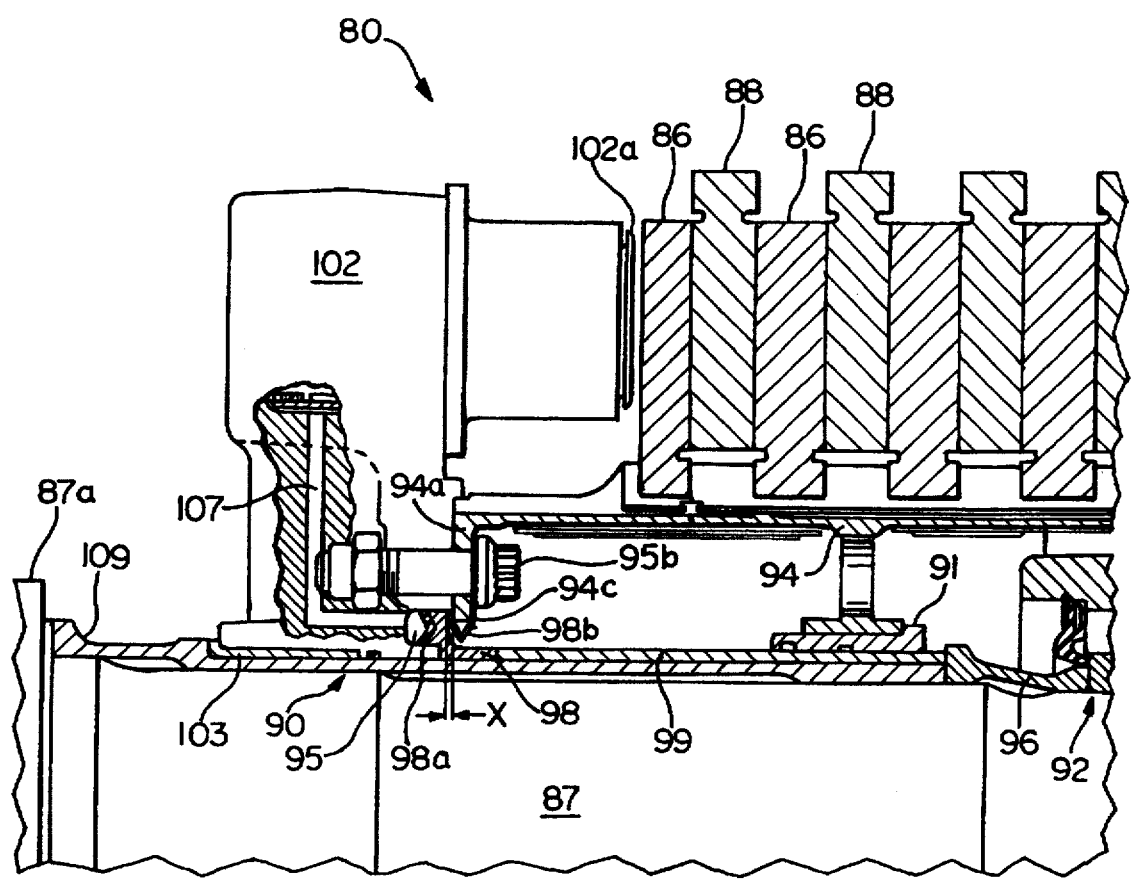
FIG. 4 is a section view of a multi-disc aircraft brake which includes a third embodiment of the brake actuator of the present invention.

Referring now to the third embodiment of the invention illustrated in FIG. 4, a multi-disc brake indicated generally by reference numeral 80 comprises a first plurality of stator discs 86 engaging the torque tube 94, a second plurality of discs 88 for engagement with a not shown wheel, a piston housing 102 which includes a plurality of circumferentially spaced apart pistons 102a, a bushing 91 disposed between a foot or support flange of the torque tube 94 and a thrust sleeve 99, the thrust sleeve 99 extending between a second axially stationary member or wheel sleeve 96 that engages a bearing assembly 92 and an actuator member 98 of a brake actuator indicated generally by reference numeral 90. Brake 80 further comprises a first axially stationary member or axle sleeve 109 extending between a radial portion 87a of axle 87 and the wheel sleeve 96.

The actuator 90 comprises a piston or actuator member 98 received within an actuation pressure chamber 95 located within piston housing 102. Piston housing 102 includes at least one fluid passage 107 for communicating fluid from a bore housing the piston 102a to the actuation pressure chamber 95 and similar passages from the other piston bores. Actuator member 98 includes a seal 98a within chamber 95, and spring means or Belleville spring 98b located between actuator member 98 and either a washer or annular member 94c of bolt and nut assembly 95b that attaches torque tube 94 to piston housing 102. Torque tube 94 includes a flange 94a, and between actuator member 98 and flange 94a is an axial clearance "X".

When piston housing 102 receives brake actuation fluid pressure, the pressure is simultaneously transmitted through passages 107 to the actuation pressure chamber 95. Initially, at an at-rest or at low fluid pressure, the brake 80 is free to rotate relative to the axle 87, such rotation occurring during extension or retraction of the landing gear. However, when fluid pressure exceeds a predetermined pressure level, the actuator member 98 overcomes the installed load of spring 98b and is displaced away from actuation pressure chamber 95, and the piston housing reacts by being forced to the left in FIG. 4 such that the piston housing and its bushing 103 engage axle sleeve 109 which abuts radial portion 87a of axle 87. The actuator member 98 is simultaneously biased against thrust sleeve 99 which is held axially stationary by wheel sleeve 96 and bearing assembly 92 anchored by a not shown wheel nut. Thus, piston housing 102 is compressed between the actuator 90 and the first axially stationary member or axle sleeve 109 (at bushing 103) and radial portion 87a. This compression would dampen vibration and reduce or eliminate squeal vibration during brake operation. Upon the termination of braking, the spring means 98b will displace the actuator member 98 leftward when the pressure in actuation pressure chamber 95 drops below the predetermined pressure level. Torque tube flange 94a also serves as an overtravel "stop" for actuator member 98 if the brake is pressurized before the installation of the brake on the axle 87. The embodiment of FIG. 4 is similar to that in FIG. 3 in that it can be integrated and implemented as part of a new brake design. The actuator 90 utilizes existing hydraulic brake pressure to provide a positive clamping or rotational retention of the multi-disc brake relative to the axle means to provide a reduction or elimination of squeal vibration modes for multi-disc aircraft brakes.

We claim:

1. A multi-disc brake and actuator for vibration damping, comprising a multi-disc brake disposed about axle means and including a piston housing engaging a torque tube, the piston housing and torque tube circumferentially movable relative to the axle means, a first plurality of discs engaging the torque tube, a second plurality of discs for engagement with a wheel, the piston housing being located axially between an actuator and a first axially stationary member at the axle means, and a thrust sleeve engaging a second axially stationary member at the axle means, operation of the actuator causing an actuator member to extend axially and compress the piston housing between the actuator member and first axially stationary member in order to reduce vibrational movement of the piston housing and torque tube relative to the axle means.

2. The multi-disc brake and actuator in accordance with claim 1, wherein the actuator is a hydraulic actuator which receives pressure transmitted simultaneously to said piston housing.

3. The multi-disc brake and actuator in accordance with claim 2, wherein a predetermined axial clearance is present between the actuator member and the torque tube prior to operation of the actuator.

4. The multi-disc brake and actuator in accordance with claim 3, wherein the actuator comprises a portion of the piston housing having therein an actuation pressure chamber and the actuator member displaceable to cause compression of spring means which is compressible at a predetermined hydraulic pressure such that the member engages the torque tube to cause displacement of the piston housing and said compression.

5. The multi-disc brake and actuator in accordance with the claim 3, wherein said spring means is a Belleville washer that provides a pressure limiter whereby the actuator member is not displaced axially until a predetermined pressure transmitted to the actuation pressure chamber is exceeded.

6. The multi-disc brake and actuator in accordance with claim 5, wherein the spring means provides a return biasing force against the actuator member so that during termination of operation of the actuator the actuator member returns axially and reestablishes the predetermined axial clearance.

7. The multi-disc brake and actuator in accordance with claim 1, wherein the brake includes an axle sleeve located about the axle and extending axially between a radial portion of the axle and said second axially stationary member, at least a portion of the axle sleeve located within the thrust sleeve.

8. The multi-disc brake and actuator in accordance with claim 1, wherein the brake comprises an aircraft brake, and the thrust sleeve is located axially between the actuator member and a wheel sleeve comprising the second axially stationary member.

9. The multi-disc brake and actuator in accordance with claim 1, wherein the thrust sleeve is located axially between the second axially stationary member and the actuator member, and the actuator member including means for sealing between the actuator member and an actuation pressure chamber of the actuator.

10. The multi-disc brake and actuator in accordance with claim 9, wherein the second axially stationary member comprises a wheel sleeve located axially between the thrust sleeve and a wheel bearing assembly disposed about the axle.

11. The multi-disc brake and actuator in accordance with claim 1, wherein the torque tube comprises a bushing assembly.

* * * * *